US011141824B2

(12) United States Patent
Plaskota et al.

(10) Patent No.: US 11,141,824 B2
(45) Date of Patent: Oct. 12, 2021

(54) APPARATUSES, SYSTEMS, AND METHODS FOR LOCATING VECTORS

(71) Applicant: Lockheed Martin Corporation, Bethesda, MD (US)

(72) Inventors: Robert P. Plaskota, Fort Worth, TX (US); Abran W. Major, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 134 days.

(21) Appl. No.: 16/431,358

(22) Filed: Jun. 4, 2019

(65) Prior Publication Data

US 2020/0384588 A1     Dec. 10, 2020

(51) Int. Cl.
   *B23P 19/10*       (2006.01)
   *G05B 19/402*      (2006.01)

(52) U.S. Cl.
   CPC ............ *B23P 19/10* (2013.01); *G05B 19/402* (2013.01); *G05B 2219/49113* (2013.01)

(58) Field of Classification Search
   CPC .................. B23P 19/10; G05B 19/402; G05B 2219/49113
   See application file for complete search history.

(56) References Cited

U.S. PATENT DOCUMENTS

| | | | |
|---|---|---|---|
| 5,741,096 A | 4/1998 | Olds | |
| 6,945,741 B2 | 9/2005 | Wang et al. | |
| 7,130,510 B2 | 10/2006 | Lester et al. | |
| 7,384,220 B2 | 6/2008 | Clark | |
| 8,043,033 B2 | 10/2011 | Clark | |
| 8,362,392 B2 | 1/2013 | Elfizy | |
| 9,481,028 B2 * | 11/2016 | Norman | B21J 15/28 |
| 10,095,214 B2 * | 10/2018 | Ghanem | G05B 19/402 |
| 10,101,725 B2 * | 10/2018 | Ghanem | G01B 11/00 |
| 10,571,889 B2 * | 2/2020 | Ghanem | G05B 19/41805 |
| 10,634,632 B2 * | 4/2020 | Troy | G01S 17/89 |
| 2005/0147477 A1 * | 7/2005 | Clark | B23Q 3/183 |
| | | | 408/76 |
| 2012/0072021 A1 * | 3/2012 | Walser | G05B 19/402 |
| | | | 700/254 |

FOREIGN PATENT DOCUMENTS

| | | |
|---|---|---|
| CN | 104625162 A | 5/2015 |
| JP | 2000343309 A | 12/2000 |

* cited by examiner

*Primary Examiner* — Ryan J. Walters
(74) *Attorney, Agent, or Firm* — Baker Botts L.L.P.

(57) ABSTRACT

In one embodiment, a spatial vector locator device includes a first tracker object, a first restraint, and a first bushing. The spatial vector locator device further includes a second tracker object, a second restraint, and a second bushing. A first reference point on the first tracker object is aligned with a vector to determine a first vector point along the vector. A second reference point on the second tracker object is aligned with the vector to determine a second vector point along the vector. An alignment rod is inserted through a first hole of the first bushing and a second hole of the second bushing to physically locate the vector in space.

13 Claims, 10 Drawing Sheets

APPARATUSES, SYSTEMS, AND METHODS FOR LOCATING VECTORS

TECHNICAL FIELD

This disclosure generally relates to locating vectors, and more specifically to apparatuses, systems, and methods for locating vectors.

BACKGROUND

Vectors may be located in space using machined hard tooling that requires design manufacturing time and cost. The use of hard tooling is limited to unique specific geometries. Vectors may be manually located by holding a vector target in place. However, manually locating vectors in space is time consuming and often produces inaccurate results.

SUMMARY

According to an embodiment, a method includes attaching a spatial vector locator device to an object. The method also includes coupling a first tracker object to a first restraint of the spatial vector locator device, aligning a first reference point of the first tracker object with a vector to determine a first vector point along the vector, and removing the first tracker object from the first restraint. The method also includes coupling a second tracker object to a second restraint of the spatial vector locator device, aligning a second reference point of the second tracker object with the vector to determine a second vector point along the vector, and removing the second tracker object from the second constraint. The method further includes coupling a first bushing to the first restraint, coupling a second bushing to the second restraint, and inserting an alignment rod through a first hole of the first bushing and a second hole of the second bushing to physically locate the vector in space.

According to another embodiment, a spatial vector locator device includes a first tracker object, a first restraint, and a first bushing. The first tracker object and the first bushing are configured to couple to the first restraint. The spatial vector locator device further includes a second tracker object, a second restraint, and a second bushing. The second tracker object and the second bushing are configured to couple to the second restraint. A first reference point on the first tracker object is aligned with a vector to determine a first vector point along the vector. A second reference point on the second tracker object is aligned with the vector to determine a second vector point along the vector. An alignment rod is inserted through a first hole of the first bushing and a second hole of the second bushing to physically locate the vector in space.

According to yet to another embodiment, a system includes a spatial vector locator device. The spatial vector locator device includes a first tracker object, a first restraint, and a first bushing. The first tracker object and the first bushing are configured to couple to the first restraint. The spatial vector locator device further includes a second tracker object, a second restraint, and a second bushing. The second tracker object and the second bushing are configured to couple to the second restraint. The system further includes an alignment rod and an object. The spatial vector locator device is attached to the object. A first reference point on the first tracker object is aligned with a vector to determine a first vector point along the vector. A second reference point on the second tracker object is aligned with the vector to determine a second vector point along the vector. The alignment rod is inserted through a first hole of the first bushing and a second hole of the second bushing to physically locate the vector in space.

Technical advantages of this disclosure may include one or more of the following. The spatial vector locator device described herein locates vectors in space more accurately than manual methods of holding bushings in place to locate vectors. For example, the spatial vector locator device described herein may locate a hole in line with a vector to an accuracy of one thousandth of an inch, whereas manually locating the hole may have an accuracy of approximately fifteen thousandths of an inch. The disclosed spatial vector locator device locates vectors in space more quickly and more cost effectively than using hard tooling when vectors do not need to be located several times. This spatial vector locator device described herein is versatile and can be used on any tool or part that has reference features that can be located with a laser tracker. Locating vectors in space using the disclosed spatial vector locator device lessens design requirements, lowers manufacturing costs, and reduces scheduling impacts as compared to using hard tooling.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

In certain embodiments disclosed herein, a spatial vector locator device accurately and efficiently locates vectors in space using a laser tracker. The disclosed spatial vector locator device allows for bushings or other hardware to be located relative to additional reference targets or geometry and bonded in place for drilling or other operations. The spatial vector locator device disclosed herein may be used to locate drill bushings to drill holes precisely where needed and at the correct angle without additional hole drilling tooling. This method may be used to locate a vector in space quickly and accurately.

In certain embodiments, the spatial vector locator device uses two precision X-Y linear translation stages to locate two points along a vector. A spherical laser target is magnetically retained on the lower precision translation stage, and the position of the spherical laser target is adjusted to locate a point on the generated vector using the guidance of a laser tracker. A spherical laser target is then magnetically retained on the upper precision translation stage, and the position of the spherical laser target is adjusted to locate a second point on the vector. Precision spherical bushings of the same geometry as the spherical laser targets are substituted for the targets in the magnetic nests. A precision pin is then inserted though both bushings, which physically locates the generated vector in space.

In some embodiments, the physically located vector is used to locate a drill bushing on a part to drill a hole. Once a bushing has been located on the part, the bushing may be temporarily bonded in place with a temporary adhesive (e.g., hot glue), and then the hole may be drilled at the exact location of the generated vector. The bushing may then be removed. In certain embodiments, one or more of the spherical bushings may be locked in its magnetically retained position. A flanged drill bushing may be used directly in the spherical bushing to drill the hole, which eliminates the need to bond an additional bushing to the part.

Figure 3A:
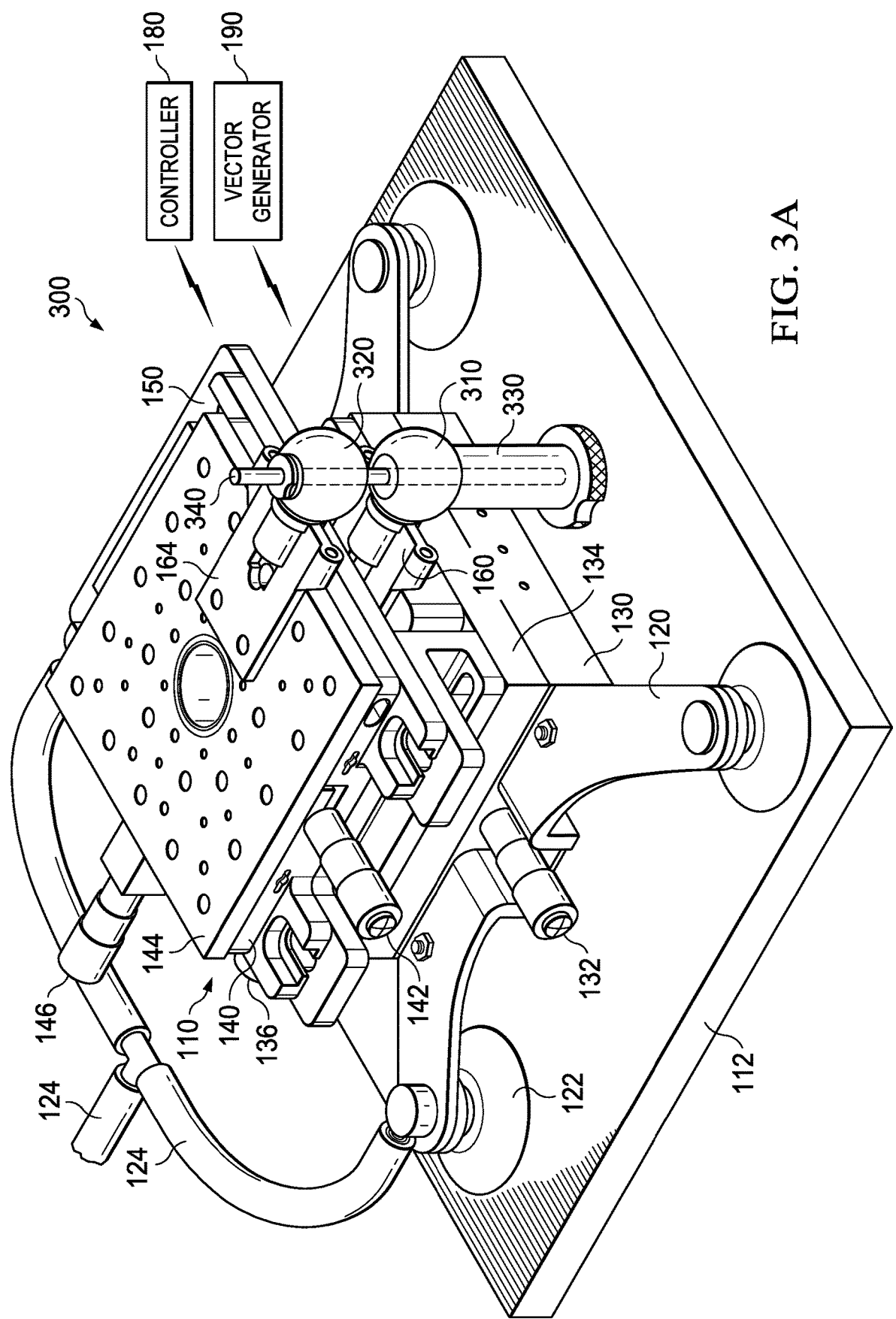
FIG. 3A illustrates another example system that uses the spatial vector locator device of FIG. 1.
Figure 3B:
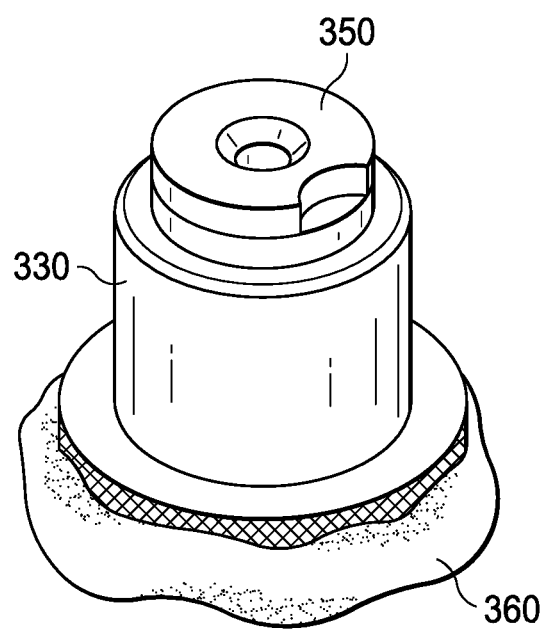
FIG. 3B illustrates an example bushing that may be used by the system of FIG. 3A.
Figure 4:
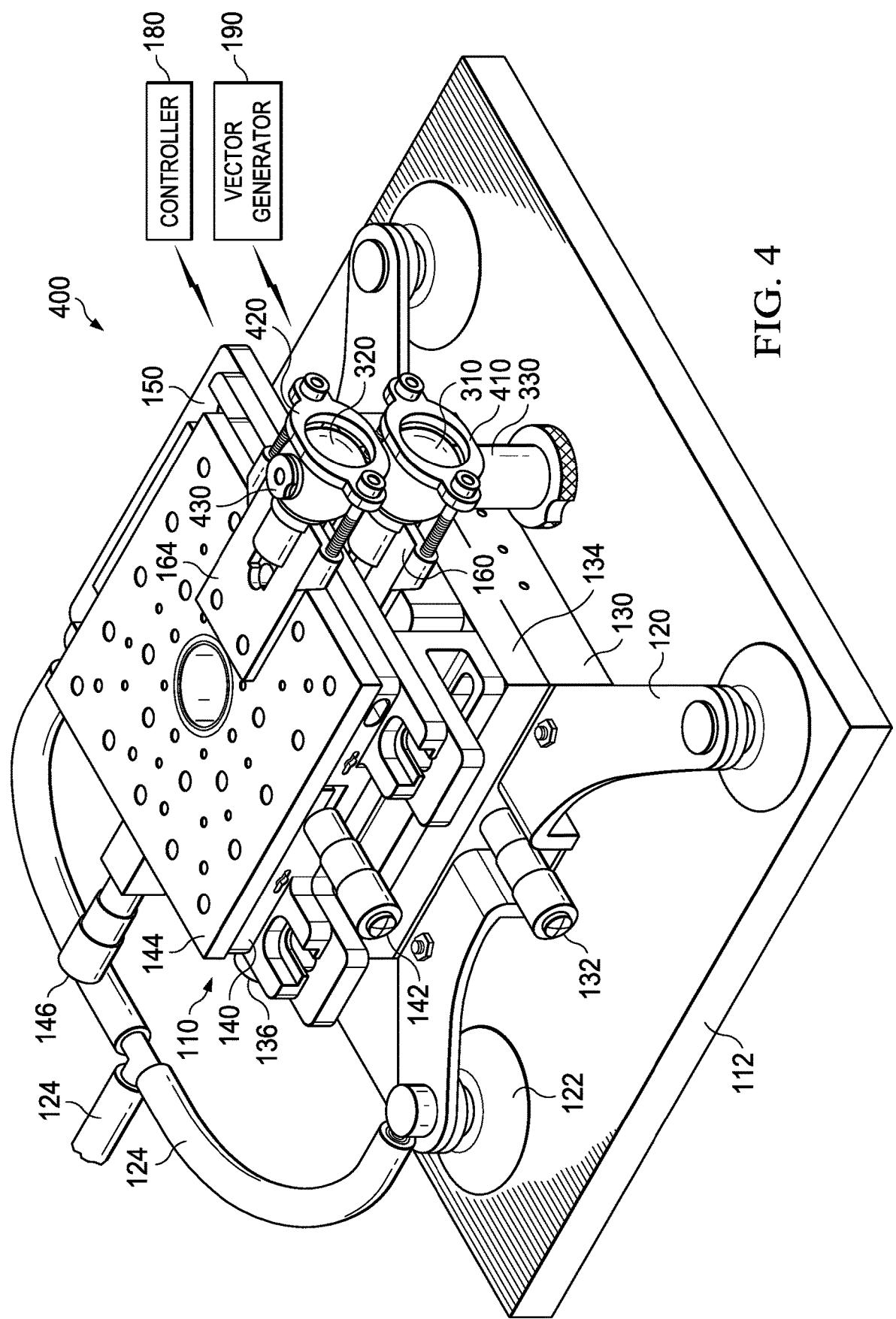
FIG. 4 illustrates another example system that uses the spatial vector locator device of FIG. 1.
Figure 5:
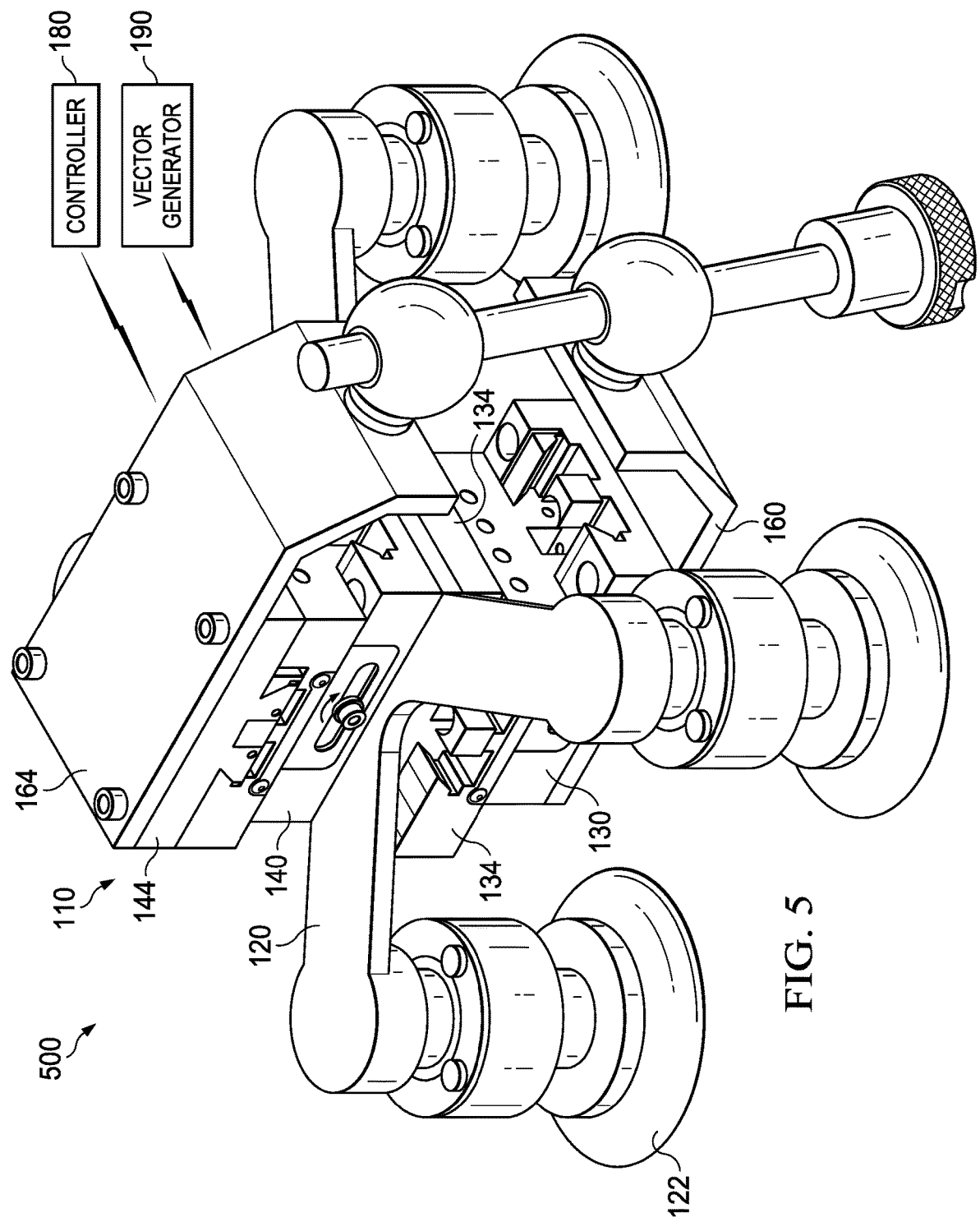
FIG. 5 illustrates an example system that uses a different configuration of the spatial vector locator device of FIG. 3A.
Figure 6:
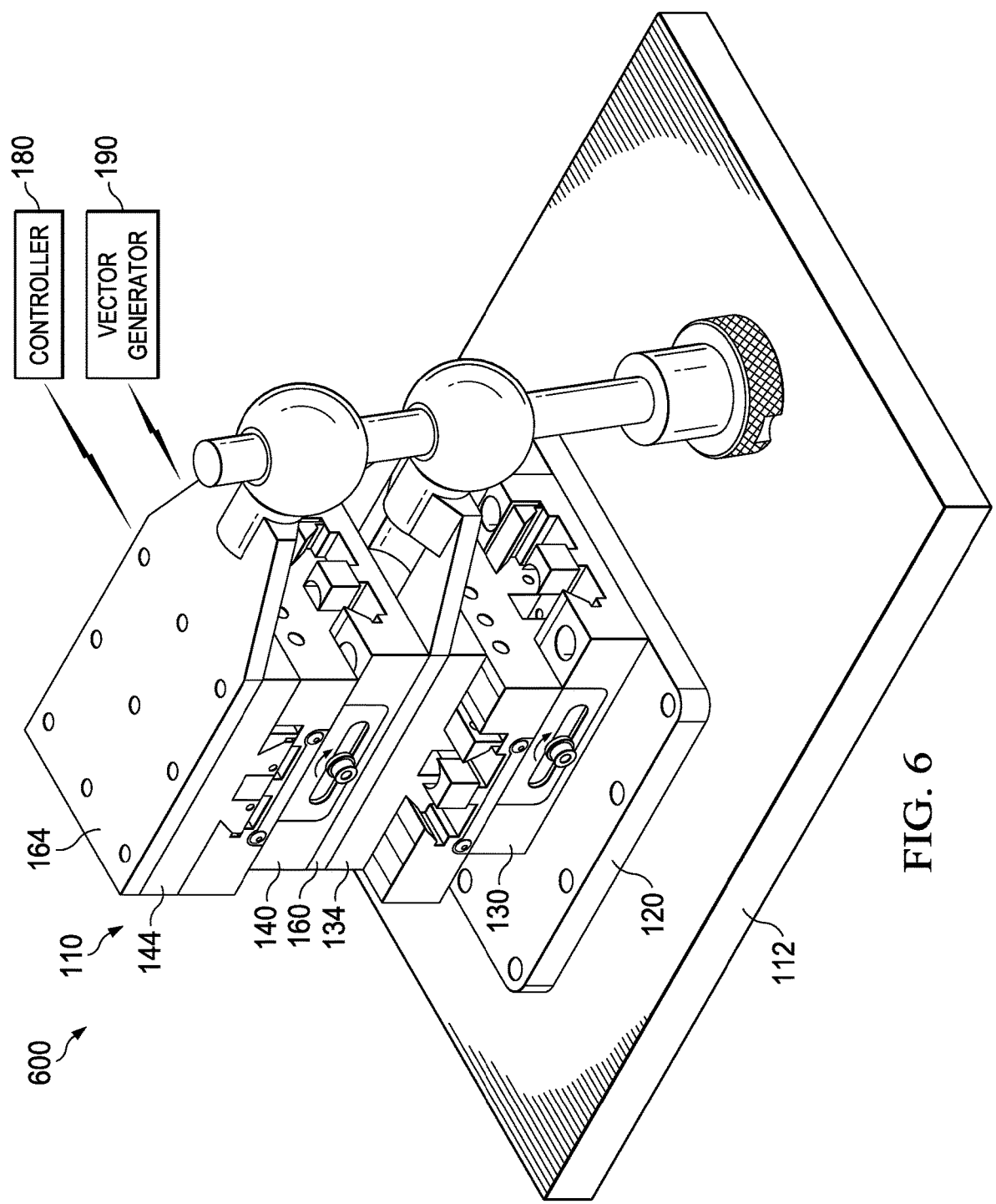
FIG. 6 illustrates another example system that uses a different configuration of the spatial vector locator device of FIG. 3A.
Figure 7:
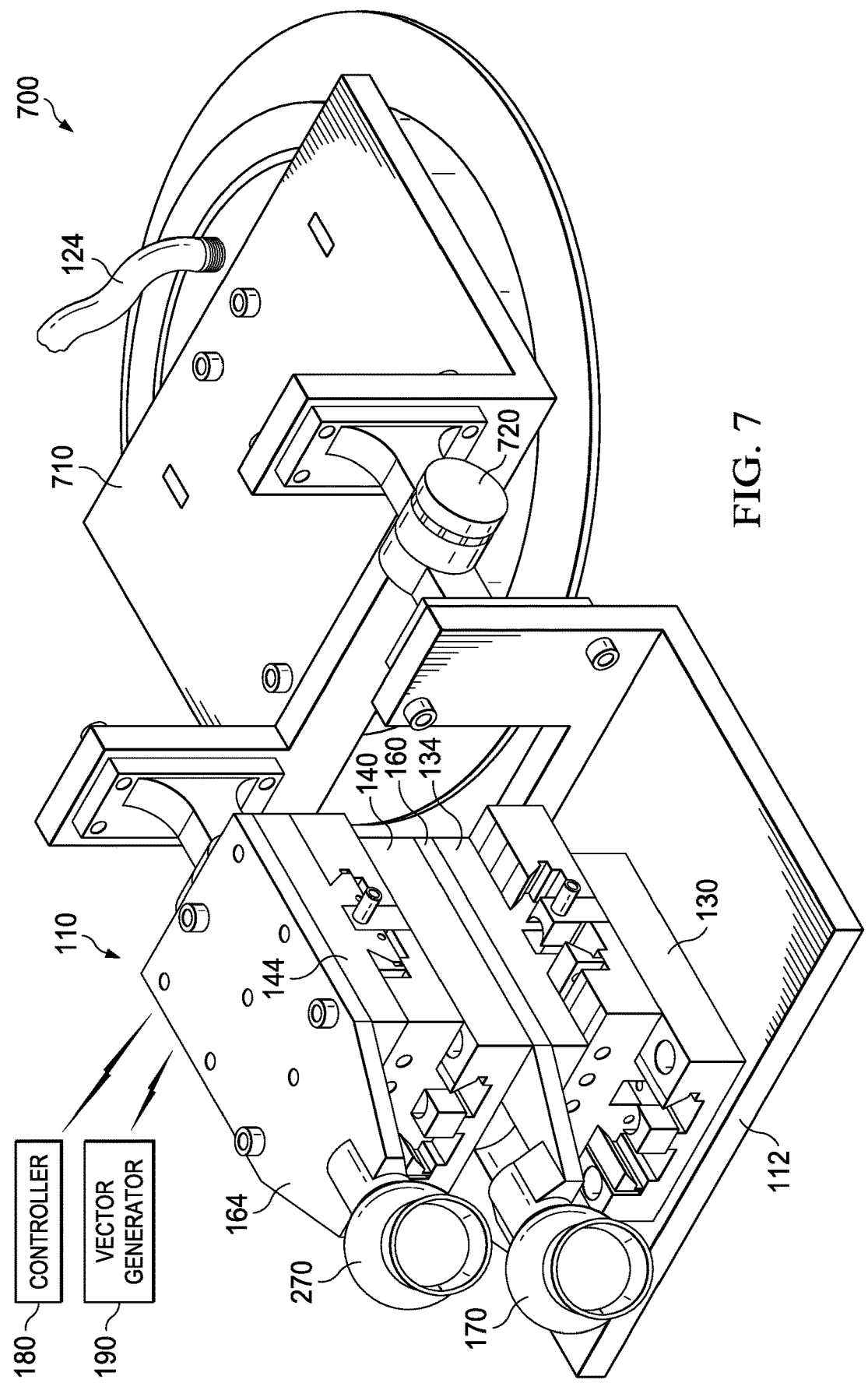
FIG. 7 illustrates an example mounting system for the configuration of the spatial vector locator device of FIG. 6.
Figure 8:
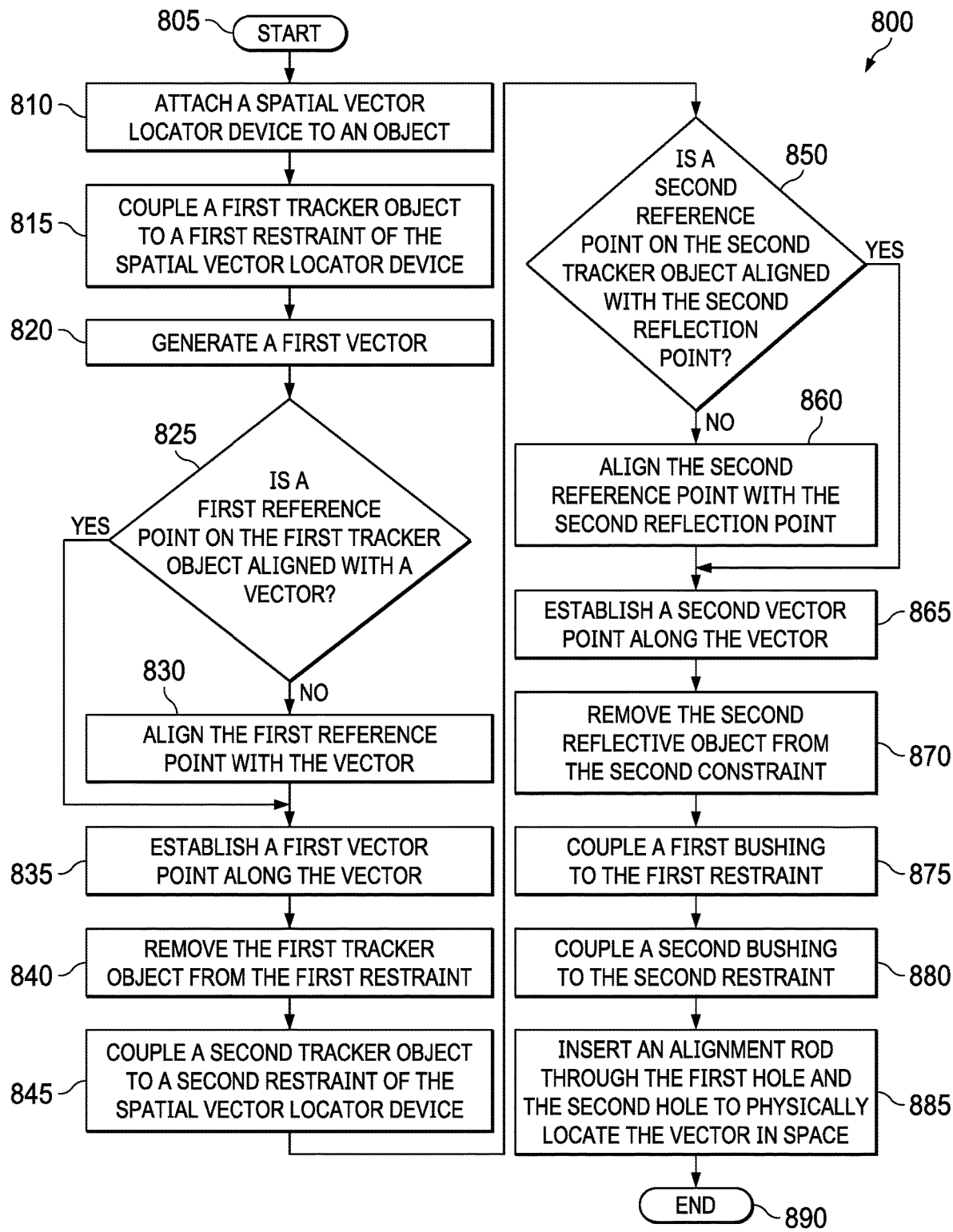
FIG. 8 illustrates an example method for locating a vector in space.
Figure 9:
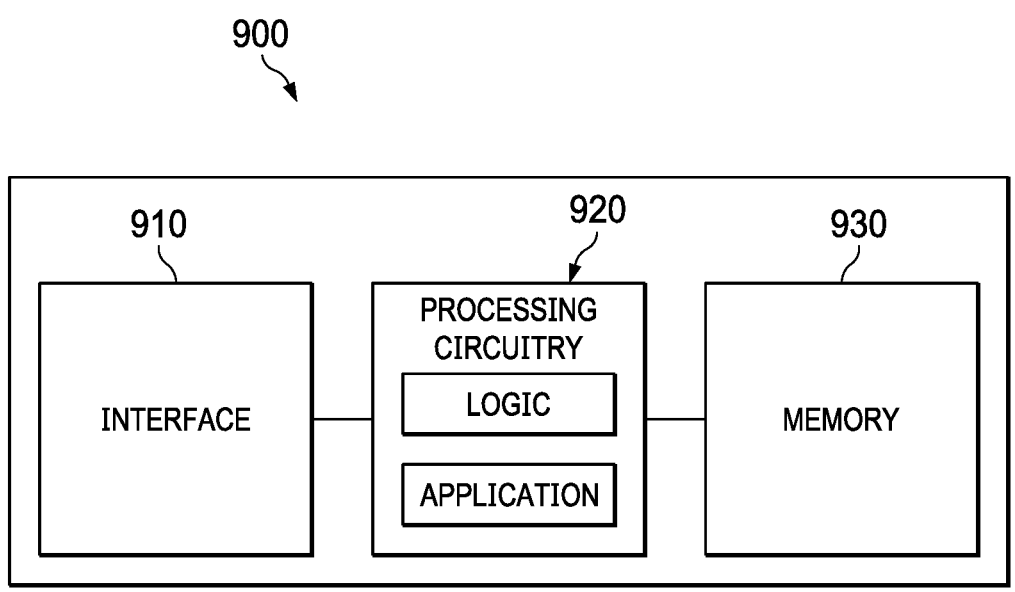
FIG. 9 illustrates an example computer system that may be used by the systems and methods described herein.

FIGS. 1 through 9 show example apparatuses, systems, and methods for locating vectors. FIGS. 1, 3, 3A, and 4 show example systems that use a spatial vector locator device, and FIGS. 5 and 6 show example systems that use different configurations of the spatial vector locator device of FIG. 3A. FIG. 7 shows an example mounting system for the configuration of the spatial vector locator device of FIG. 6. FIG. 8 shows an example method for locating a vector in space. FIG. 9 shows an example computer system that may be used by the systems and methods described herein.

Figure 1:
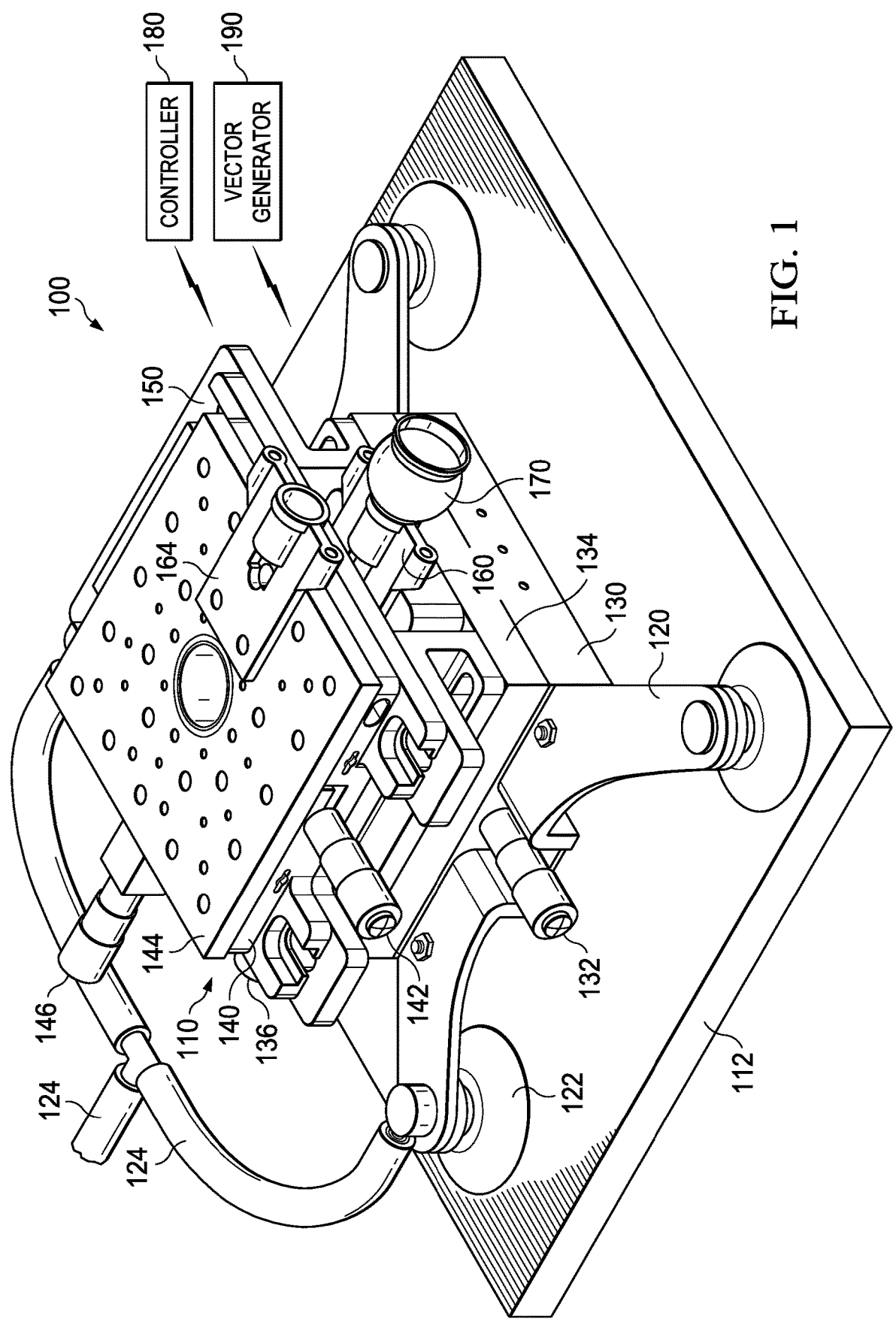
FIG. 1 illustrates an example system that uses a spatial vector locator device.

FIG. 1 illustrates an example system 100 that uses a spatial vector locator device 110. System 100 of FIG. 1 incudes spatial vector locator device 110, an object 112, a tracker object 170, a controller 180, and a vector generator 190. Spatial vector locator device 110 of system 100 is any device that can locate vectors in space. For example, spatial vector locator device 110 may be used to locate a vector relative to object 112 to perform operations such as locating bushings for drilling holes at specific locations. In certain embodiments, spatial vector locator device 110 is electronically motorized. Object 112 of system 100 is any component upon which a vector can be located. Object 112 may be a part (e.g., an aircraft wing), a tool, a plate, a piece of machinery, construction equipment, and the like. Object 112 may be associated with industrial machinery, the aircraft industry, the automotive industry, the shipbuilding industry, and the like. Object 112 may have one or more reference features that are located with a laser tracker (e.g., vector generator 190).

Spatial vector locator device 110 of system 100 includes a mounting plate 120, fasteners 122, vacuum tubes 124, a first lower plate 130, a micro-adjuster 132 for first lower plate 130, a second lower plate 134, a micro-adjuster 136 for second lower plate 134, a first upper plate 140, a micro-adjuster 142 for first upper plate 140, a second upper plate 144, a micro-adjuster 146 for second upper plate 144, a transition plate 150, a lower restraint 160, and an upper restraint 164.

Mounting plate 120 of spatial vector locator device 110 is any component used to mount spatial vector locator device 110 to object 112. In the illustrated embodiment of FIG. 1, mounting plate 120 includes four legs. Each leg of mounting plate 120 is attached to object 112 with a fastener 122. Fastener 122 is any component that can physically attach mounting plate 120 to object 112. Fasteners 122 locate and fix spatial vector locator device 110 at a predetermined location on object 112. In the illustrated embodiment of FIG. 1, fasteners 122 are suction cups. Each leg of mounting plate 120 is integrated with vacuum plenums, and a vacuum tube 124 is attached to one or more legs of mounting plate 129. Vacuum tubes 124 may include one or more integrated valves. Vacuum tubes 124 are connected to a vacuum and assist in suctioning fasteners 122 to object 112 to prevent mounting plate 120 of spatial vector locator device 110 from moving relative to object 112. In the illustrated embodiment of FIG. 1, fasteners 122 are temporary fasteners that provide for quick attachment and detachment of mounting plate 120 to object 112. In certain embodiments, one or more fasteners 122 may be a clamp, a bolt, a screw, an adhesive, a weld, and the like.

First lower plate 130 of spatial vector locator device 110 attaches to mounting plate 120 such that mounting plate 120 is located between object 112 and first lower plate 130. Second lower plate 134 attaches to first lower plate 130 such that first lower plate 130 is located between mounting plate 10 and second lower plate 134. First lower plate 130 and second lower plate 134 are any components that can move in two directions. For example, first lower plate 130 may slide in an X direction and second lower plate 134 may slide in a Y direction. In certain embodiments, first lower plate 130 and second lower plate 134 are X-Y translation mechanical stages. First lower plate 130 and/or second lower plate 134 may be rectangular or square in shape. First lower plate 130 and/or second lower plate 134 may include one or more openings. First lower plate 130 and second lower plate 134 may be equipped with a locking control that fixes first lower plate 130 and second lower plate 134 in position relative to object 112. In certain embodiments, first lower plate 130 and second lower plate 134 are the same or similar in size. For example, first lower plate 130 and second lower plate 134 may each be ¾ inches in thickness, five inches in width, and five inches in depth.

Micro-adjuster 132 for first lower plate 130 is any device that controls the movement of first lower plate 130. For example, micro-adjuster 132 may be a translational control knob situated on a side of first lower plate 130 that can be adjusted to move first lower plate 130 in an X direction. Similarly, micro-adjuster 136 for second lower plate 134 is any device that controls the movement of second lower plate 134. For example, micro-adjuster 136 may be a translational control knob situated on a side of second lower plate 134 that can be adjusted to move second lower plate 134 in a Y direction.

Transition plate 150 attaches to second lower plate 134 such that second lower plate 134 is located between first lower plate 130 and transition plate 150. Transition plate 150 is any component that provides a separation distance between second lower plate 134 and first upper plate 140. In certain embodiments, transition plate 150 is one and a half inches in depth.

First upper plate 140 of spatial vector locator device 110 attaches to transition plate 150 such that transition plate 150 is located between second lower plate 134 and first upper plate 140. Second upper plate 144 attaches to first upper plate 140 such that first upper plate 140 is located between transition plate 150 and second upper plate 144. First upper plate 140 and second upper plate 144 are any components that can move in two directions. For example, first upper plate 140 may slide in an X direction and second upper plate 144 may slide in a Y direction. In certain embodiments, first upper plate 140 and second upper plate 144 are X-Y translation mechanical stages. First upper plate 140 and/or second upper plate 144 may be rectangular or square in shape. First upper plate 140 and/or second upper plate 144 may include one or more openings. First upper plate 140 and second upper plate 144 may be equipped with a locking control that fixes first upper plate 140 and second upper plate 144 in position relative to object 112. In certain embodiments, first upper plate 140 and second upper plate 144 are the same or similar in size. For example, first upper plate 140 and second upper plate 144 may each be ¾ inches in thickness, five inches in width, and five inches in depth.

Micro-adjuster 142 for first upper plate 140 is any device that controls the movement of first upper plate 140. For example, micro-adjuster 142 may be a translational control knob situated on a side of first upper plate 140 that can be adjusted to move first upper plate 140 in an X direction. Similarly, micro-adjuster 146 for second upper plate 144 is any device that controls the movement of second upper plate 144. For example, micro-adjuster 146 may be a translational control knob situated on a side of second upper plate 144 that can be adjusted to move second upper plate 144 in a Y direction.

Lower restraint 160 of spatial vector locator device 110 is any component that restrains a component (e.g., tracker object 170) from movement relative to lower restraint 160. Lower restraint 160 is physically attached (e.g., bolted, welded, screwed, etc.) to second lower plate 134 such that lower restraint 160 is restricted from movement relative to second lower plate 134. Lower restraint 160 may include a magnetic nest. The magnetic nest may receive a magnetically charged component (e.g., tracker object 170) and hold the component in place by a magnetic force.

Similarly, upper restraint 164 of spatial vector locator device 110 is any component that restrains a component (e.g., tracker object 170) from movement relative to upper restraint 164. Upper restraint 164 is physically attached (e.g., bolted, welded, screwed, etc.) to second upper plate 144 such that upper restraint 164 is restricted from movement relative to second upper plate 144. Upper restraint 164 may include a magnetic nest. The magnetic nest may receive a magnetically charged component (e.g., tracker object 170) and hold the component in place by a magnetic force.

Tracker object 170 of system 100 is any object that can track a vector. For example, tracker object 170 may track a vector generated by vector generator 190 of system 100. Tracker object 170 may be a tracker ball that is coincident with a vector generated by vector generator 190. In certain embodiments, tracker object 170 is a laser reflector ball. In the illustrated embodiment of FIG. 1, tracker object 170 is a sphere. Tracker object 170 has a reference point that is used to determine a vector point along the vector. The reference point may be the center of tracker object 170. In the illustrated embodiment of FIG. 1, the center of tracker object 170 is the center of the sphere.

Controller 180 of system 100 is any processing device that produces data and/or controls the operations of one or more components of system 100. For example, controller 180 may determine the location of a center point of tracker object 170 relative to a vector generated by vector generator 190. As another example, controller 180 may initiate one or more movements of spatial vector locator device 110. Controller 180 is communicatively coupled to spatial vector locator device 110. Controller 180 may be hard wired and/or wirelessly connected to spatial vector locator device 110. Controller 180 may include a processor, a memory, and an interface. Controller 180 may include a display. Controller 180 may be a desktop computer, a laptop computer, a handheld device, a tablet, a smartphone, and the like.

Vector generator 190 of system 100 is any instrument that can generate a vector. Vector generator 190 may be positioned on a stand (e.g., a tripod) such that vector generator 190 has an unobstructed view of object 112. In certain embodiments, vector generator 190 is a laser tracker that generates a laser vector. Vector generator 190 may be communicatively coupled to controller 180 and/or spatial vector locator device 110.

One or more components of system 100 may be manually or automatically controlled. For example, a user (e.g., a human operator of spatial vector locator device 110) may manually adjust micro-adjuster 132, micro-adjuster 136, micro-adjuster 142, and/or micro-adjuster 146 based on output received from controller 180 of system 100 to align the center of tracker object 170 with the generated vector. As another example, first lower plate 130, second lower plate 134, first upper plate 140, and/or second upper plate 144 may include one or more motors that automatically adjust the location of first lower plate 130, second lower plate 134, first upper plate 140, and/or second upper plate 144 based on output generated by controller 180 of system 180 to align the center of tracker object 170 with the generated vector.

In operation, spatial vector locator device 110 of system 100 is attached to object 112 using fasteners 122. For example, spatial vector locator device 110 may be attached to object 112 using two or more suction cups that are suctioned to object 112 using one or more vacuum tubes 124. Tracker object 170 is attached to lower restraint 160 of spatial vector locator device 110. Vector generator 190 generates a vector. Controller 180 determines a location of the vector relative to a center of tracker object 170. Controller 180 displays the relative locations to a user, and the user adjusts micro-adjuster 132 and/or micro-adjuster 136 to align the vector and the center of tracker object 170, which establishes a vector point along the vector. As such, spatial vector locator device 110 of FIG. 1 may locate a vector point along a vector more accurately, quicker, and more cost effectively than hard tooling.

Figure 2:
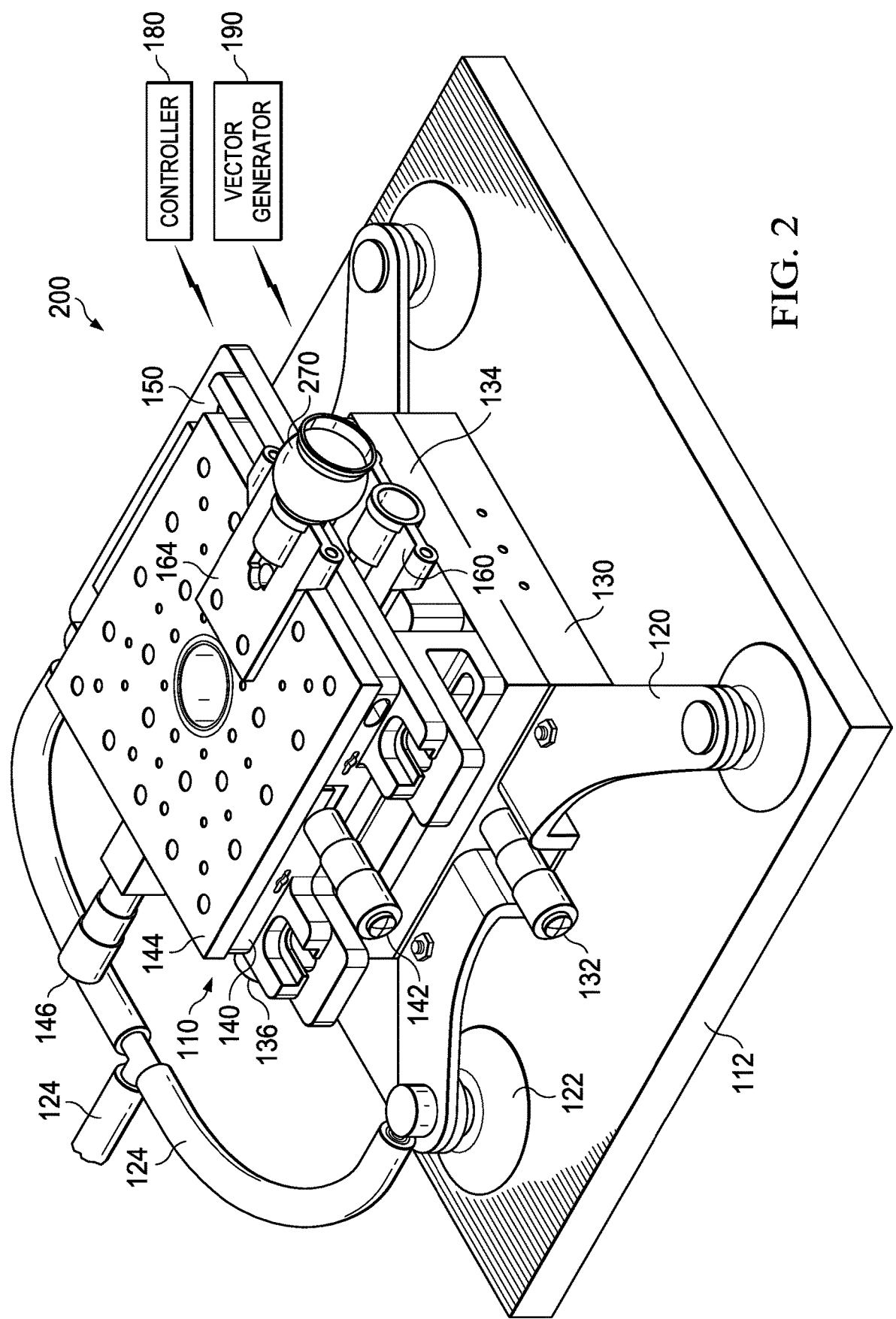
FIG. 2 illustrates another example system that uses the spatial vector locator device of FIG. 1.

FIG. 2 illustrates an example system 200 that uses spatial vector locator device 110 of FIG. 1. System 200 of FIG. 2 may be used in conjunction with system 100 of FIG. 1. System 200 includes spatial vector locator device 110, object 112, mounting plate 120, fasteners 122, vacuum tubes 124, first lower plate 130, micro-adjuster 132, second lower plate 134, micro-adjuster 136, first upper plate 140, micro-adjuster 132, second upper plate 144, micro-adjuster 146, transition plate 150, lower restraint 160, upper restraint 164, controller 180, and vector generator 190. The components of system 200 are described in FIG. 1 above.

Additionally, system 200 of FIG. 2 includes tracker object 270. Tracker object 270 of system 200 is any object that can track a vector. For example, tracker object 270 may track a vector generated by vector generator 190 of system 200. Tracker object 270 may be a tracker ball that is coincident with a vector generated by vector generator 190. In certain embodiments, tracker object 270 is a laser reflector ball. In the illustrated embodiment of FIG. 2, tracker object 270 is a sphere. Tracker object 270 has a reference point that is used to determine a vector point along the vector. The reference point may be the center of tracker object 270. In the illustrated embodiment of FIG. 2, the center of tracker object 270 is the center of the sphere. Tracker object 170 of FIG. 1 and tracker object 270 may be the same object in certain embodiments. Tracker object 170 of FIG. 1 and tracker object 270 may be identical in size and/or shape in some embodiments.

In operation, vector generator 190 of system 200 generates a vector, and a first vector point along the vector is established using system 100 of FIG. 1. Tracker object 170 of FIG. 1 is removed from lower restraint 160 of spatial vector locator device 110, and tracker object 270 of system 200 is attached to upper restraint 164 of spatial vector locator device 110. Controller 180 determines a location of the vector relative to the center of tracker object 270. Controller 180 displays the relative locations to a user, and the user adjusts micro-adjuster 142 and/or micro-adjuster 146 to align the vector and the center of tracker object 270, which establishes a second vector point along the vector. The first and second vector points may be used to locate the vector in space. As such, spatial vector locator device 110 of FIGS. 1 and 2 locate a vector in space more accurately, quicker, and more cost effectively than hard tooling.

FIG. 3A illustrates an example system 300 that uses spatial vector locator device 110 of FIG. 1. System 300 of FIG. 3A may be used in conjunction with system 100 of FIG. 1 and/or system 200 of FIG. 2. System 300 includes spatial vector locator device 110, object 112, mounting plate 120, fasteners 122, vacuum tubes 124, first lower plate 130, micro-adjuster 132, second lower plate 134, micro-adjuster 136, first upper plate 140, micro-adjuster 132, second upper plate 144, micro-adjuster 146, transition plate 150, lower restraint 160, upper restraint 164, controller 180, and vector generator 190. The components of system 300 are described in FIG. 1 above.

Additionally, system 300 of FIG. 3A includes a first bushing 310, a second bushing 320, a third bushing 330, and an alignment rod 340. First bushing 310, second bushing 320, and third bushing 330 are bearings with linings (e.g., cylindrical linings) that are used to control the location of alignment rod 340. First bushing 310, second bushing 320, and third bushing 330 each include an opening that can receive alignment rod 340. First bushing 310, second bushing 320, and third bushing 330 may resemble the shape of a wheel with an opening at the center of the wheel. The openings of first bushing 310, second bushing 320, and third bushing 330 may have the same size and/or shape. In the illustrated embodiment of FIG. 3, the openings of first bushing 310, second bushing 320, and third bushing 330 are circular in size and cylindrical in shape.

In the illustrated embodiment of FIG. 3A, first bushing 310 is attached to lower restraint 160 and second bushing is attached to upper restraint 164. First bushing 310 is similar in size to target object 170 of FIG. 1. For example, first bushing 310 and target object 170 of FIG. 1 may have a same outside diameter. Second bushing 320 is similar in size to target object 270 of FIG. 2. For example, second bushing 320 and target object 270 of FIG. 2 may have a same outside diameter. In certain embodiments where target object 170 of FIG. 1 and target object 270 of FIG. 2 are identical in size and shape and/or are the same object, first bushing 310 and second bushing 320 may be identical in size and shape. For example, target object 170 of FIG. 1, target object 270 of FIG. 2, first bushing 310, and second bushing 320 may all have a same outside diameter. In the illustrated embodiment of FIG. 3, first bushing 310 is a ferromagnetic spherical bushing of identical diameter to target object 170 of FIG. 1 and second bushing 320 is a ferromagnetic spherical bushing of identical diameter to target object 270 of FIG. 2.

As illustrated in FIG. 3A, third bushing 330 may include a flange. The flange of third bushing 330 may contact and/or be flush with object 112. In certain embodiments, the opening of first bushing 310, second bushing 320, and third bushing 330 is slightly larger than the diameter of alignment rod 340. For example, the opening of first bushing 310, second bushing 320, and third bushing 330 may be 0.5 inches in diameter, and alignment rod 340 may be 0.4995 inches in diameter. Third bushing 330 is located between first bushing 310 and object 112. In certain embodiments, third bushing 330 is attached to object 112 using a fastener (e.g., adhesive, bolts, screws, welds, tape, etc.)

Alignment rod 340 is any component that can be inserted into first bushing 310, second bushing 320, and/or third bushing 330. Alignment rod 340 may be a straight rod, shaft, pin, bar, and the like. First bushing 310, second bushing 320, third bushing 330, and alignment rod 340 may be made of any suitable material. For example, one or more of first bushing 310, second bushing 320, third bushing 330, and alignment rod 340 may be made of one or more types of metal. Alignment rod 340 is used to physically locate a vector in space.

In operation, vector generator 190 of system 300 generates a vector. A first vector point along the vector is established using system 100 of FIG. 1 and a second vector point along the vector is established using system 200 of FIG. 2. Tracker object 170 of FIG. 1 is removed from lower restraint 160 of spatial vector locator device 110, and tracker object 270 of system 200 is removed from upper restraint 164 of spatial vector locator device 110. First bushing 310, which is similar in shape to tracker object 170 of FIG. 1, is attached to lower restraint 160 of spatial vector locator device 110 such that first bushing 310 replaces tracker object 170 of FIG. 1. Second bushing 320, which is similar in shape to tracker object 270 of FIG. 2, is attached to upper restraint 164 of spatial vector locator device 110 such that second bushing 320 replaces tracker object 270 of FIG. 2. Third bushing 330 is placed in line with first bushing 310 and second bushing 320 between first bushing 310 and object 112.

Alignment rod 340 is then inserted through the opening of first bushing 310, the opening of second bushing 320, and the opening of third bushing 330 such that alignment rod 340 physically represents the location of the vector in space. As such, spatial vector locator device 110 of FIGS. 1, 2, and 3A may physically locate a vector in space more accurately, quicker, and more cost effectively than hard tooling.

FIG. 3B illustrates an example third bushing 330 that may be used by system 300 of FIG. 3A. As shown, third bushing 330 of FIG. 3 includes a flange in contact with object 112. A flange bushing 350 is inserted into third bushing 330. Flange bushing 350 is similar to and smaller than third bushing 330. The hole of flange bushing 350 is smaller in diameter than the hole of third bushing 330. Flange bushing 350 is used to reduce the size of the opening through third bushing 330.

In operation, third bushing 330 is physically attached to object 112 using a fastener (e.g., a temporary fastener) such as hot glue. Once the fastener is fixed in place (e.g., the hot glue has cooled), alignment rod 340 of FIG. 3A is removed from the opening of first bushing 310 of FIG. 3A, second bushing 320 of FIG. 3A, and third bushing 330. Device 110 of FIG. 3A is then removed from object 112. Flange bushing 350 is inserted into the opening of third bushing 330, and a hole is drilled in line with the generated vector using flange bushing 350. As such, system 300 of FIG. 3A uses third bushing 330 to physically locate a vector on object 112, which may allow a hole to be drilled on object 112 in a more accurate location (e.g., within one thousandths of an inch of the desired location) than a location determined using hard tooling or manual methods.

FIG. 4 illustrates an example system 400 that uses spatial vector locator device 110 of FIG. 1. System 400 of FIG. 4 may be used in conjunction with system 100 of FIG. 1, system 200 of FIG. 2, and/or system 300 of FIG. 3A. System 400 includes spatial vector locator device 110, object 112, mounting plate 120, fasteners 122, vacuum tubes 124, first lower plate 130, micro-adjuster 132, second lower plate 134, micro-adjuster 136, first upper plate 140, micro-adjuster 132, second upper plate 144, micro-adjuster 146, transition plate 150, lower restraint 160, upper restraint 164, controller 180, vector generator 190, first bushing 310, second bushing 320, and third bushing 330. The components of system 400 are described in FIGS. 1 and 3A above.

Additionally, system 400 of FIG. 4 includes a lower clamp 410, an upper clamp 420, and a flange bushing 430. Lower clamp 410 fixes first bushing 310 in place to prevent first bushing 310 from movement relative to device 110. In the illustrated embodiment of FIG. 4, lower clamp 410 attaches to lower restraint 160. Upper clamp 420 fixes second bushing 320 in place to prevent second bushing 320 from movement relative to spatial vector locator device 110. In the illustrated embodiment of FIG. 4, upper clamp 420 attaches to upper restraint 164. Flange bushing 430 is inserted into second bushing 320. Flange bushing 430 is similar to flange busing 350 of FIG. 3B. Flange bushing 430 is used to reduce the size of the opening of second bushing 320.

In the illustrated embodiment of FIG. 4, third bushing 330 is not attached to object 112. First bushing 310 is clamped into place using lower clamp 410 and second bushing 320 is clamped into place using upper clamp 420 such that object 112 may be drilled directly using first busing 310 and second bushing 320. After first bushing 310 and second bushing 320 are clamped into position, a tube or sleeve may be inserted through first bushing 310 and second bushing 320. In certain embodiments, third bushing 330 and flange bushing 430 may be fixed at each end of first bushing 310 and second bushing 320, respectively, to make the assembly more rigid and to guide the drill bit. Object 112 may then be drilled without having to bond or otherwise fix a bushing (e.g., bushing 330) to object 112. In certain embodiments, a drill bushing (e.g., flange bushing 430) may be inserted directly into first bushing 310 and second bushing 320 and a drill bit may be inserted into the drill bushings.

In operation, alignment rod 340 of FIG. 3A is inserted through the opening of first bushing 310, the opening of second bushing 320, and the opening of third bushing 330 using system 100 of FIG. 1, system 200 of FIG. 2, and system 300 of FIG. 3A such that alignment rod 340 physically represents the location of a generated vector in space. Lower clamp 410 is attached to lower restraint 160 to secure first bushing 310 in place. Upper clamp 410 is attached to upper restraint 164 to secure second bushing 320 in place. Once first bushing 310 and second bushing 320 are clamped in place, alignment rod 340 of FIG. 3A is removed from the opening of first bushing 310 of FIG. 3A, the opening of second bushing 320 of FIG. 3A, and the opening of third bushing 330 of FIG. 3A. Flange bushing 430 is inserted into the opening of second bushing 320, and a hole is drilled in line with the generated vector using flange bushing 430. As such, system 400 of FIG. 4 secures first bushing 310 and second bushing 320 in place to physically locate a vector on object 112 and then uses flange bushing 430 to drill a hole in object 112, which allows a hole to be drilled on object 112 in a more accurate location than a location determined using hard tooling or manual methods.

FIG. 5 illustrates an example system 500 that uses a different configuration of spatial vector locator device 110 of FIG. 3A. System 500 of FIG. 5 may be used in conjunction with system 100 of FIG. 1, system 200 of FIG. 2, system 300 of FIG. 3A, and/or system 400 of FIG. 4. System 500 includes spatial vector locator device 110, object 112, mounting plate 120, fasteners 122, vacuum tubes 124, first lower plate 130, micro-adjuster 132, second lower plate 134, micro-adjuster 136, first upper plate 140, micro-adjuster 132, second upper plate 144, micro-adjuster 146, lower restraint 160, upper restraint 164, controller 180, vector generator 190, first bushing 310, second bushing 320, third bushing 330, and alignment rod 340. The components of system 500 are described in FIGS. 1 and 3A above.

In the illustrated embodiment of FIG. 5, mounting plate 120 is located between second lower plate 134 and first upper plate 140. Mounting plate 120 attaches to second lower plate 134 and first upper plate 140. The legs of mounting plate 120 extend out horizontally from second first lower plate 130 and second lower plate 134 and vertically to object 112. Lower restraint 160 attaches to first lower plate 130. Upper restraint 164 attaches to second upper plate 144. This configuration provides a greater distance between first vector point established in system 100 of FIG. 1 and a second vector point established in system 200 of FIG. 2.

FIG. 6 illustrates an example system 600 that uses a different configuration of spatial vector locator device 110 of FIG. 3A. System 600 of FIG. 6 may be used in conjunction with system 100 of FIG. 1, system 200 of FIG. 2, system 300 of FIG. 3A, and/or system 400 of FIG. 4. System 600 includes spatial vector locator device 110, object 112, mounting plate 120, first lower plate 130, micro-adjuster 132, second lower plate 134, micro-adjuster 136, first upper plate 140, micro-adjuster 132, second upper plate 144, micro-adjuster 146, lower restraint 160, upper restraint 164, controller 180, vector generator 190, first bushing 310, second bushing 320, third bushing 330, and alignment rod 340. The components of system 600 are described in FIGS. 1 and 3A above.

In the illustrated embodiment of FIG. 6, mounting plate 120 is located between object 112 and first lower plate 130. Mounting plate 120 may be attached to object 112 using any suitable fasteners (e.g., suction cups, clamps, bolts, screws, welds, adhesive, and the like.) Mounting plate 120 may be clamped, fastened, fixed, or mounted to object 112. In the illustrated embodiment of FIG. 6, first upper plate 140 and second upper plate 144 (e.g., an upper translation stage) is stacked directly above first lower plate 130 and second lower plate 134 (e.g., a lower translation stage). Lower restraint 160 attaches to second lower plate 134. Upper restraint 164 attaches to second upper plate 144. This configuration provides versatility in attaching spatial vector locator device 110 to object 112.

FIG. 7 illustrates an example mounting system 700 for the configuration of spatial vector locator device 110 of FIG. 6. System 700 of FIG. 7 may be used in conjunction with system 100 of FIG. 1, system 200 of FIG. 2, system 300 of FIG. 3A, system 400 of FIG. 4, and system 600 of FIG. 6. System 700 includes spatial vector locator device 110, object 112, mounting plate 120, first lower plate 130, micro-adjuster 132, second lower plate 134, micro-adjuster 136, first upper plate 140, micro-adjuster 132, second upper plate 144, micro-adjuster 146, lower restraint 160, upper restraint 164, controller 180, vector generator 190, first bushing 310, second bushing 320, third bushing 330, and alignment rod 340. The components of system 700 are described in FIGS. 1 and 3A above.

Additionally, system 700 of FIG. 7 includes a fastener plate 710 and locking swivels 720. Fastener plate 710 is a component that fastens to object 112. Fastener plate 710 may be attached to a portion of object 112 that is away from a side of spatial vector locator device 110. Fastener plate 710 may be attached to an object other than object 112. Locking swivel 720 is a coupling between fastening plate 710 and mounting plate 120 that allows mounting plate 120 to revolve without turning fastener plate 710. Locking swivel 720 may allow mounting plate 120 to rotate horizontally and/or vertically. The embodiment of FIG. 7 is versatile in that mounting plate 170 may be rotated about one or more axes and/or fastener plate 710 may be attached away from spatial vector locator device 110.

Systems 100, 200, 300, 400, 500, 600, and 700 of FIGS. 1 through 7 or portions thereof may be associated with an entity, which may include any entity, such as a business or company, that locates vectors. The elements of systems 100, 200, 300, 400, 500, 600, and 700 of FIGS. 1 through 7 may be implemented using any suitable combination of hardware, firmware, and software. For example, one or more components of systems 100, 200, 300, 400, 500, 600, and 700 of FIGS. 1 through 7 may use one or more components of the computer system described below in FIG. 9. One or more components of systems 100, 200, 300, 400, 500, 600, and 700 of FIGS. 1 through 7 may be made of any suitable material (e.g., steel, aluminum, rubber, copper, adhesives, plastic, etc.)

Although systems 100, 200, 300, 400, 500, 600, and 700 of FIGS. 1 through 7 illustrate a particular number of devices 110, objects 112, mounting plates 120, fasteners 122, vacuum tubes 124, first lower plates 130, micro-adjusters 132, second lower plates 134, micro-adjusters 136, first upper plates 140, micro-adjusters 132, second upper plates 144, micro-adjusters 146, transition plates 150, lower restraints 160, upper restraints 164, tracker objects 170, controllers 180, vector generators 190, tracker objects 270, first bushings 310, second bushings 320, third bushings 330, alignment rods 340, flange bushings 350, fasteners 360, lower clamps 410, upper clamps 420, flange bushings 430, fastener plates 710, and locking swivels 720, this disclosure contemplates any suitable number of devices 110, objects 112, mounting plates 120, fasteners 122, vacuum tubes 124, first lower plates 130, micro-adjusters 132, second lower plates 134, micro-adjusters 136, first upper plates 140, micro-adjusters 132, second upper plates 144, micro-adjusters 146, transition plates 150, lower restraints 160, upper restraints 164, tracker objects 170, controllers 180, vector generators 190, tracker objects 270, first bushings 310, second bushings 320, third bushings 330, alignment rods 340, flange bushings 350, fasteners 360, lower clamps 410, upper clamps 420, flange bushings 430, fastener plates 710, and locking swivels 720. For example, system 100 of FIG. 1 may include more or less than three fasteners 122.

Although systems 100, 200, 300, 400, 500, 600, and 700 of FIGS. 1 through 7 illustrate a particular arrangement of spatial vector locator device 110, object 112, mounting plate 120, fasteners 122, vacuum tubes 124, first lower plate 130, micro-adjuster 132, second lower plate 134, micro-adjuster 136, first upper plate 140, micro-adjuster 132, second upper plate 144, micro-adjuster 146, transition plate 150, lower restraint 160, upper restraint 164, tracker object 170, controller 180, vector generator 190, tracker object 270, first bushing 310, second bushing 320, third bushing 330, alignment rod 340, flange bushing 350, fastener 360, lower clamp 410, upper clamp 420, flange bushing 430, fastener plate 710, and locking swivels 720, this disclosure contemplates any suitable arrangement of spatial vector locator device 110, object 112, mounting plate 120, fasteners 122, vacuum tubes 124, first lower plate 130, micro-adjuster 132, second lower plate 134, micro-adjuster 136, first upper plate 140, micro-adjuster 132, second upper plate 144, micro-adjuster 146, transition plate 150, lower restraint 160, upper restraint 164, tracker object 170, controller 180, vector generator 190, tracker object 270, first bushing 310, second bushing 320, third bushing 330, alignment rod 340, flange bushing 350, fastener 360, lower clamp 410, upper clamp 420, flange bushing 430, fastener plate 710, and locking swivels 720.

FIG. 8 illustrates an example method for locating a vector in space. Method 800 begins at step 805. At step 810, a spatial vector locator device (e.g., spatial vector locator device 110 of FIG. 1) is attached to an object (e.g., object 112 of FIG. 1). For example, a mounting plate (e.g., mounting plate 120 of FIG. 1) of the spatial vector locator device may be attached to the object (e.g., a part) with four fasteners (e.g., fasteners 122 of FIG. 1). The fasteners may be suction cups that suction to the object when a vacuum generator is activated. The suction cups locate and fix the device at a predetermined location on the object. Method 800 then moves from step 810 to step 815.

At step 815, a first tracker object (e.g., tracker object 170 of FIG. 1) is coupled to a first restraint (e.g., lower restraint 160 of FIG. 1) of the spatial vector locator device. For example, the first tracker object may be a laser reflector ball that attaches magnetically to a magnetic nest of the first restraint. Method 800 then moves from step 815 to step 820. At step 820, a vector is generated by a vector generator (e.g., vector generator 190 of FIG. 1). Method 800 then moves from step 820 to step 825.

At step 825, method 800 determines whether a first reference point of the first tracker object is aligned with the vector generated by the vector generator. The first reference point may be the center of the first tracker object. Controller (e.g., controller 180) may determine a location of the first reference point and a location of the laser relative to the first reference point and display this information to a user using a display device such as a computer, a tablet, a smartphone, and the like. If method 800 determines that the first reference point of the first tracker object is aligned with the vector generated by the vector generator, method 800 advances from step 825 to step 835. If method 800 determines that the first reference point of the first tracker object is not aligned with the vector generated by the vector generator, method 800 moves from step 825 to step 830.

At step 830, the first reference point of the first tracker object is aligned with the vector. For example, a first lower micro-adjuster (e.g., micro-adjuster 132 of FIG. 1) coupled to a first lower plate (e.g., first lower plate 130 of FIG. 1) and/or a second lower micro-adjuster (e.g., micro-adjuster 136 of FIG. 1) coupled to a second lower plate (e.g., second lower plate 134 of FIG. 1) may be adjusted to align the first reference point of the first tracker object with the vector. Method 800 then moves from steps 825 and 830 to step 835, where a first vector point is established along the vector. Method 800 then moves from step 835 to step 840.

At step 840, the first tracker object is removed from the first restraint. For example, the first tracker object may be a laser reflector ball that detaches magnetically from a magnetic nest of the first restraint. Method 800 then moves from step 840 to step 845, where a second tracker object (e.g., tracker object 270 of FIG. 2) is coupled to a second restraint (e.g., upper restraint 164 of FIG. 1) of the spatial vector locator device. For example, the second tracker object may be a laser reflector ball that attaches magnetically to a magnetic nest of the second restraint. In certain embodiments, the first tracker object and the second tracker object are the same object. Method 800 then moves from step 845 to step 850.

At step 850, method 800 determines whether a second reference point of the second tracker object is aligned with the vector generated by the vector generator. The second reference point may be the center of the second tracker object. Controller may determine a location of the first reference point and a location of the laser relative to the first reference point and display this information to the user using the display device mentioned above. If method 800 determines that the second reference point of the second tracker object is aligned with the vector generated by the vector generator, method 800 advances from step 850 to step 865. If method 800 determines that the second reference point of the second tracker object is not aligned with the vector generated by the vector generator, method 800 moves from step 850 to step 860.

At step 860, the second reference point of the second tracker object is aligned with the vector. For example, a first upper micro-adjuster (e.g., micro-adjuster 142 of FIG. 1) coupled to a first upper plate (e.g., first upper plate 140 of FIG. 1) and/or a second upper micro-adjuster (e.g., micro-adjuster 146 of FIG. 1) coupled to a second upper plate (e.g., second upper plate 144 of FIG. 1) may be adjusted to align the second reference point of the second tracker object with the vector. Method 800 then moves from steps 850 and 860 to step 865, where a second vector point is established along the vector. Method 800 then moves from step 865 to step 870.

At step 870, the second tracker object is removed from the second restraint. For example, the second tracker object may be a laser reflector ball that detaches magnetically from a magnetic nest of the second restraint. Method 800 then moves from step 870 to step 875, where a first bushing (e.g., first bushing 310 of FIG. 3A) is coupled to the first restraint. For example, the first bushing may be a ferromagnetic spherical bushing that attaches magnetically to a magnetic nest of the first restraint. The first bushing is similar in size to the first tracker object. For example, the first bushing may have the same outside diameter as the first tracker object. Method 800 then moves from step 875 to step 880.

At step 880, a second bushing (e.g., second bushing 320 of FIG. 3A) is coupled to the second restraint. For example, the second bushing may be a ferromagnetic spherical bushing that attaches magnetically to a magnetic nest of the second restraint. The second bushing is similar in size to the second tracker object. For example, the second bushing may have the same outside diameter as the second tracker object. Method 800 then moves from step 880 to step 885, where an alignment rod (e.g., alignment rod 340 of FIG. 3A) is inserted through a first hole of the first bushing and a second hole of the second bushing to physically locate the vector in space. Method 800 then moves from step 885 to step 890, where method 800 ends.

Modifications, additions, or omissions may be made to method 800 depicted in FIG. 8. Method 800 may include more, fewer, or other steps. For example, method 800 may include positioning a third bushing (e.g., third bushing 330 of FIG. 3A) on the object, inserting the alignment rod through a third hole of the third bushing to locate the third bushing relative to the object, removing the alignment rod, inserting a flange bushing (e.g., flange bushing 350 of FIG. 3B) into the third hole of the third bushing, and drilling a fourth hole in the object using the flange bushing. As another example, method 800 may include removing the alignment rod, inserting a flange bushing (e.g., flange bushing 430 of FIG. 4) into the second hole of the second bushing, and drilling a third hole in the object using the flange bushing.

Steps of method 800 depicted in FIG. 8 may be performed in parallel or in any suitable order. For example, steps 815 and 820 of method 800 may be reversed. As another example, steps 875 and 880 of method 800 may be reversed. While discussed as specific components completing the steps of method 800, any suitable component may perform any step of method 800.

FIG. 9 illustrates an example of elements 900 that may be included in system 100 of FIG. 1, according to certain embodiments. For example, controller 180 of FIG. 1 may include one or more interface(s) 910, processing circuitry 920, memory(ies) 930, and/or other suitable element(s). Interface 910 receives input, sends output, processes the input and/or output, and/or performs other suitable operation. Interface 910 may comprise hardware and/or software.

Processing circuitry 920 performs or manages the operations of the component. Processing circuitry 920 may include hardware and/or software. Examples of a processing circuitry include one or more computers, one or more microprocessors, one or more applications, etc. In certain embodiments, processing circuitry 920 executes logic (e.g., instructions) to perform actions (e.g., operations), such as generating output from input. The logic executed by processing circuitry 920 may be encoded in one or more tangible, non-transitory computer readable media (such as memory 930). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 930 (or memory unit) stores information. Memory 930 may comprise one or more non-transitory, tangible, computer-readable, and/or computer-executable storage media. Examples of memory 930 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A spatial vector locator device, comprising:
   a first tracker object, a first restraint, and a first bushing, wherein the first tracker object and the first bushing are configured to couple to the first restraint;
   a second tracker object, a second restraint, and a second bushing, wherein the second tracker object and the second bushing are configured to couple to the second restraint;
   wherein:
      a first reference point on the first tracker object is aligned with a vector to determine a first vector point along the vector;
      a second reference point on the second tracker object is aligned with the vector to determine a second vector point along the vector; and
      an alignment rod is inserted through a first hole of the first bushing and a second hole of the second bushing to physically locate the vector in space.

2. The spatial vector locator device of claim 1, wherein:
   a third bushing is positioned on the object;
   the alignment rod is inserted through a third hole of the third bushing;
   the third bushing is physically attached to the object;
   the alignment rod is removed;
   a flange bushing is inserted into the third hole of the third bushing; and
   a fourth hole is drilled in an object attached to the spatial vector locator device using the flange bushing.

3. The spatial vector locator device of claim 1, wherein:
   the alignment rod is removed;
   a flange bushing is inserted into the second hole of the second bushing; and
   a third hole is drilled in an object attached to the spatial vector locator device using the flange bushing.

4. The spatial vector locator device of claim 1, wherein:
   the first tracker object is a spherical shaped object;
   the second tracker object is the first tracker object;
   the first tracker object, the first bushing, and the second bushing have a same outside diameter; and
   the first reference point and the second reference point on the first tracker object each align with a vertical axis of the first tracker object relative to ground.

5. The spatial vector locator device of claim 1, further comprising:
   a first lower micro-adjuster coupled to a first lower plate that is used to align the first reference point on the first tracker object with the vector;
   a second lower micro-adjuster coupled to a second lower plate that is used to align the first reference point on the first tracker object with the vector;
   a first upper micro-adjuster coupled to a first upper plate that is used to align the second reference point on the second tracker object with the vector; and
   a second upper micro-adjuster coupled to a second upper plate that is used to align the second reference point on the second tracker object with the vector.

6. The spatial vector locator device of claim 1, further comprising two or more suction cups used to attach the spatial vector locator device to an object.

7. The spatial vector locator device of claim 1, wherein a processor communicatively coupled to the laser tracker device is used to:
   align the first reference point on the first tracker object with the vector; and
   align the second reference point on the second tracker object with the vector.

8. A system, comprising:
   a spatial vector locator device, the spatial vector locator device comprising:
      a first tracker object, a first restraint, and a first bushing, wherein the first tracker object and the first bushing are configured to couple to the first restraint; and
      a second tracker object, a second restraint, and a second bushing, wherein the second tracker object and the second bushing are configured to couple to the second restraint;
   an alignment rod; and
   an object;
   wherein:
      the spatial vector locator device is attached to the object;
      a first reference point on the first tracker object is aligned with a vector to determine a first vector point along the vector;
      a second reference point on the second tracker object is aligned with the vector to determine a second vector point along the vector; and
      the alignment rod is inserted through a first hole of the first bushing and a second hole of the second bushing to physically locate the vector in space.

9. The system of claim 8, further comprising a third bushing positioned on the object, wherein:
   the alignment rod is inserted through a third hole of the third bushing;
   the third bushing is physically attached to the object;
   the alignment rod is removed;
   a flange bushing is inserted into the third hole of the third bushing; and
   a fourth hole is drilled in the object using the flange bushing.

10. The system of claim 8, further comprising a flange bushing, wherein:
    the alignment rod is removed;

the flange bushing is inserted into the second hole of the second bushing; and a third hole is drilled in the object using the flange bushing.

11. The system of claim 8, wherein:

the first tracker object is a spherical shaped object;

the second tracker object is the first tracker object;

the first tracker object, the first bushing, and the second bushing have a same outside diameter; and the first reference point and the second reference point on the first tracker object each align with a vertical axis of the first tracker object relative to ground.

12. The system of claim 8, further comprising:

a first lower micro-adjuster coupled to a first lower plate that is used to align the first reference point on the first tracker object with the vector;

a second lower micro-adjuster coupled to a second lower plate that is used to align the first reference point on the first tracker object with the vector;

a first upper micro-adjuster coupled to a first upper plate that is used to align the second reference point on the second tracker object with the vector; and a second upper micro-adjuster coupled to a second upper plate that is used to align the second reference point on the second tracker object with the vector.

13. The system of claim 8, further comprising two or more suction cups used to attach the spatial vector locator device to the object.

* * * * *